E. B. KILLEN.
RUBBER TIRE.
APPLICATION FILED JUNE 29, 1918.
1,312,124.  Patented Aug. 5, 1919.
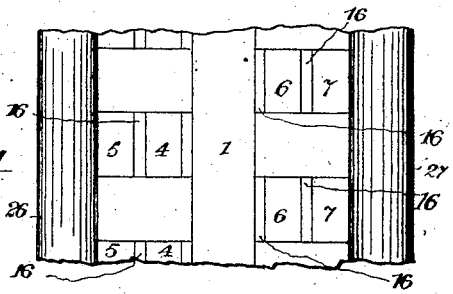
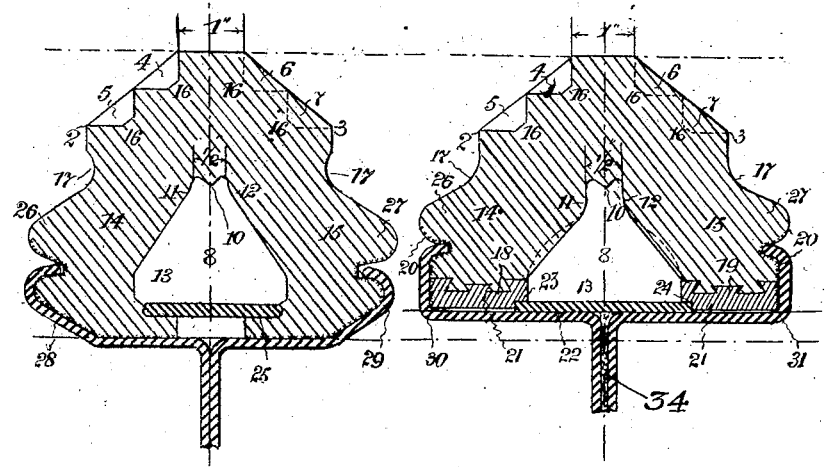
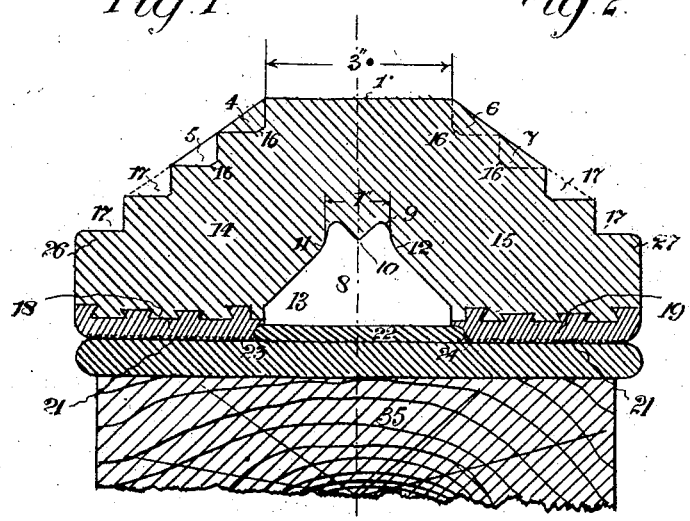

UNITED STATES PATENT OFFICE.

EDWARD BRICE KILLEN, OF LONDON, ENGLAND.

RUBBER TIRE.

1,312,124.   Specification of Letters Patent.   Patented Aug. 5, 1919.

Application filed June 29, 1918. Serial No. 242,620.

*To all whom it may concern:*

Be it known that I, EDWARD BRICE KILLEN, of 27 Queen Victoria street, London, E. C. 4, England, engineer, have invented certain new and useful Improvements in Rubber Tires, of which the following is a specification.

This invention relates to the manufacture of what I call cushion tires as distinct from inflated air tube tires. In this tire I prefer to attach the tire to its wheel so that the air within the tire when fitted over the wheel is at atmospheric pressure but confined, the tire requiring no inner air tube, air valve or pump. Under certain conditions this type of tire may be used without the air being confined, but the tire is not then so efficient as when the air is confined.

In the accompanying drawings, Figure 1 is a cross section of a tire made in accordance with and embodying my invention.

Fig. 2 is a cross section illustrating a modified form of the tire.

Fig. 3 is a cross section illustrating a modified form of tire with a wide base attached by say vulcanite to endless metal base rims and airtightly attached to a wheel or bonding rim by great compression.

Fig. 4 is a plan of the tire shown in Fig. 2, all hereafter more fully referred to and described.

My construction with reference to the drawings is as follows:—

An important feature about my new construction of tire is the tread, which has great give or shock absorbing qualities when in road contact. The tread is manufactured in cross section of gable-like formation, see Figs. 1, 2 and 3, with a narrow extreme treading circumference 1 which is preferably flat in cross section at the top of the gable, the tread having two effective widths, which I will call the narrow treading part 1, and the wide treading part 2—3 of the tire. The narrow extreme treading part of the tire is preferably manufactured without cavities, and may be say ⅓ or ¼ of the tread's maximum width at 2—3. The wide gable-like part of the tread 2—3 automatically comes into action as and when required and has preferably treading cavities and groove spaces 4, 5, 6, 7 and 17 formed at each side of the extreme narrow treading part, see Figs. 1 and 2 and 3. This narrow extreme treading part 1 is capable of giving much in road contact under all working conditions without the rubber in the tire being stretched beyond its elastic limit, and without interfering with the ability of the tire to carry its required load. In say a 6 inch wide tire, this narrow extreme treading part may be manufactured about 1 inch wide, see Figs. 1 and 2, but when brought into road contact it automatically becomes in effect much wider, changing in effective width from 1 inch to 2, 3 or 4 inches, as and when required, and when the tire is manufactured say 8 to 12 inches wide, see Fig. 3, the narrow extreme tread may be manufactured 2 or more inches wide, and become in effect, when in road contact, say 6 to 10 inches wide according to the type of tire manufactured, but under all conditions the narrow treading part of the tire 1 comes into tractional contact with the hard road surface and remains in close tractional contact with the hard road surface while the widest part 2—3 of the tread comes in and goes out of road contact.

In all my tires I mold within the tread an endless inner air chamber 8 which in cross section is preferably of gable-like formation, although not strictly triangular in shape, the apex or extreme circumference of the endless air chamber being constructed with a blunt portion 9, which may have an inwardly projecting ridge 10, the blunt portion being molded say ½ inch to 1 inch in width, or say half the width of the narrow extreme treading part 1 of the tire. Further, the endless gable-like air chamber is preferably formed so that its two converging sides of walls 11 and 12, as they approach each other (when forming the blunt apex 9 of the endless air chamber) are curved, see Fig. 2, the internal surfaces or walls of the air chamber being constructed so that the distortion and thickening of the walls under a load or shock does not develop serious frictional contact of the internal wall surfaces. The base 13 of the gable-like air chamber 8 may be two to five times wider than the blunt apex 9 according to the type of tire manufactured, and the wider the base part 13 of the gable-like air chamber is, (after constructing the tire walls and their base foundation of proper strength and thickness to carry the required loads) the greater is the give or resilience of the tire in road contact. The tire is preferably constructed so that it is capable of being rigidly and air-tightly attached to a wheel, the endless air chamber 8 within the tire becoming when the tire is attached, an airtight chamber, see Figs. 1 and 2, or the airtight chamber may be arranged by fitting the tire under compression to the metal bed of a bonding rim or wheel in any wellknown manner, see Fig. 3. The confined air within the tire gives to the tire a greater frequency of repose than if the air was not confined, thereby increasing the tire's maximum speed, besides giving many other advantages to the tire. This type of tire has the advantages of a strong narrow effective tread 1 without its disadvantages, and the advantages of a strong wide effective tread 2—3 without its disadvantages when in road contact, the narrow part or extreme circumference of the tread 1 having much more give or resiliency than the right and left edges 2 and 3 of the tread. The narrow extreme part of the tread 1 may be two to five inches more in diameter than the right and left edges of the tread 2 and 3, according to the type of tire manufactured, and its construction enables said narrow treading part 1 to come into effective road contact and be put under compression before the maximum width of the tread 2 and 3 at the same spot can possibly come into effective use, enabling a great flat tread surface circumferentially to be formed in road contact automatically under ordinary and abnormal working conditions, and this circumferential flat surface in road contact enables more inches of tire wall circumferentially to be brought into effective use to carry excessive loads and take abnormal shocks, without injuring the tire, and in addition to the great number of inches of tire wall circumferentially brought into effective use, the maximum width of the tread 2—3 comes into effective use with increase of load or shock. In other words, the tire is automatically strengthened and widened in effect as and when required when say passing over potholes, mounting curbstones, turning corners sharply, running over tramway lines, or when the brakes are suddenly applied, or in fact when the tires are subjected to those abnormal working conditions which prematurely destroy existing tires.

I wish it to be clearly understood that the gable-like treading circumference of my tire loses its original molded shape when brought into road contact and becomes more or less flat instead of gable-like in cross section, the displaced rubber under distortion flowing or spewing into cavities or spaces prepared for its reception. It is also to be noted that not only does the sensitive wide gable-like treading circumference of the tire 2—3 become practically flat in cross section, but the distortable rubber walls of the tire 14 and 15 thicken and spew internally and externally with increase of load.

This type of tire enables great give in road contact (or resiliency) combined with great strength and a long mileage to be obtained in tires manufactured and attached as per this invention, without any risk of the tire puncturing or collapsing during its entire life, and the rubber in the tire is not stretched beyond its elastic limit even when the tire is carrying maximum loads and taking abnormal shocks.

Suitable cavities 4, 5, 6 and 7 say one inch wide are preferably molded at each side of the narrow extreme treading part of the tire, each of which in plan may form a right-angled parallelogram, see Fig. 4, having preferably blunt angles to prevent serious frictional contact of surfaces. These cavities may be molded in plan in two circumferential rows, at each side of the narrow treading part of the tire 1, these cavities alternating with each other transversely of the tire tread, the said cavities and the intervening transverse ribs being of equal width, and are staggered so that the cavities on one side of the narrow tread end on the same cross section line where the others begin, see Fig. 4, the narrow extreme treading part 1 being formed to lie between the four rows of cavities 4, 5, 6 and 7, see Fig. 4, and so that the rubber in the extreme treading part of the tire is capable of flowing or being partly spewed into the cavities 4, 5, 6, and 7 when displaced in road contact. This narrow treading part 1 of the tire is capable of easily passing through road grease or mud and getting into direct biting contact with the hard road surface, the grease and mud passing into the cavities, 4, 5, 6 and 7 at each side of the narrow tread, thereby forming a good non-skid device without the use of steel studs, and the depth of the cavity from its right or obtuse angle 16 (which is preferably made blunt, see Figs. 1, 2 and 4) to its open base, may be about ¼ to ¾ of an inch according to the type of tire manufactured. In fact with this type of tire, deep cavities like 4, 5, 6 and 7, or circumferential groove spaces like 17 of any well-known shape may be suitably molded on the wide gable-like tread, and when required, steel studs having say a fabric or other foundation may be suitably secured on the tread.

The base or inner circumferential parts of this type of tire may be constructed in different ways, but I always prefer that said base is so constructed as to be capable of being air tightly attached to a wheel. The tire may be manufactured having metal in its base, the rubber walls being attached to the metal by means of say vulcanite or its equivalent, in say a manner somewhat similar to the way metal is attached to the base of existing solid rubber band tires, see Figs. 2 and 3, and under such conditions, I may use two suitable endless metal foundation bands 18 and 19, Fig. 3, or 21, Fig. 2, with a suitable rough surface on each foundation band, the rubber forming the two walls of the tire being efficiently attached during manufacture to each metal foundation band, thereby having a suitable metal foundation and unstretchable base part on each tire wall, and fabric 20 may be used in addition to the endless metal rims to stiffen and strengthen the outside base part of the walls of said tire when required, see Fig. 2. There is no difficulty in molding the endless gable-like air chamber 8 with its wide base part 13 within the tire by means of a suitable divisible core, which is easily extracted from the tire after manufacture. The airtight attachment of the tire to its wheel may be made by having a suitable layer of rubber $21^a$ say $\frac{1}{16}$ inch thick, formed on the inner circumference of each of the metal foundation bands 18 and 19. These form the inner base part of each tire wall, so that by fitting the tire under compression to a metal bonding rim or over a wheel 35, see Fig. 3, the tire is airtightly attached to the wheel, and in order to keep the two tire walls with their metal foundations in correct relative position to each other when fitting the tire under compression over a wheel, I may use suitable detachable metal spacing or distance pieces 22, formed to the proper arc of a circle, and fit same between the two metal base foundations of the tire walls, see Figs. 2 and 3. The sides of the metal distance pieces lie snugly in cavities 23, 24, formed on the endless metal base bands 18, 19 and 21 of the tire, prepared for their reception. Or I may manufacture the tire without metal at its base part, constructing the base beads of each tire with hooking heels and extended toes, using fabric to strengthen and stiffen the base part and inner circumference of each base bead, see Fig. 1, and attach the tire airtightly to a wheel by means of an endless airtight metal rim 25, which is fitted and floated within the tire on the tire's extended toes, see Fig. 1, in combination with suitable hooking metal clamping flanges or rims 28, 29, 30 and 31 with bolts and nuts, as used in some existing types of tires.

I also preferably mold protecting ribs or buffers of rubber 26, 27, on the outside of the tire walls about $1\frac{1}{2}$ to $2\frac{1}{4}$ inches from the tire's extreme inner base circumference, which rubber ribs preferably lie outside the tire's metal retaining rims. These rubber ribs form the widest part of the tire and not only stiffen and strengthen the base part of each tire wall, but they protect the metal retaining rims 18 and 19, see Fig. 3, of the tire, or the extreme metal clamping flanges or rims 28, 29, 30 and 31, of the wheel, from injury against curbstones and other road obstructions, see Figs. 1 and 2.

The tires may be constructed in all suitable widths and diameters and of suitable materials, to suit the work for which they are manufactured, but it is to be noted that extra width in the base of the gable-like air chamber, enables more give and resiliency to be obtained in the tire, so that tires having a wide base will be more resilient than tires with a narrow base. For chassis work on ordinary roads when the width of the tire is under 8 inches, I may make the height of the tire in cross section from 20 to 100% less than its width, see Figs. 1 and 2, and when the width of the tire is over 8 inches and used on the road on heavy chassis, the tire's height in cross section may be less than half its width, see Fig. 3.

The thickness of the rubber in the tread between the apex of the endless air chamber and the tire's extreme treading circumference may be from 1 to 3 inches, and the thickness of the tire walls (which are not manufactured uniform in thickness throughout their height), may vary from $\frac{3}{4}$ to 6 inches according to the type of tire manufactured. The tire may be manufactured having three special widths, namely the narrow treading width 1, the wide gable-like treading width 2—3, and the extreme tire width. The latter is that part of the tire where protecting ribs or buffers of rubber 26, 27 are molded to protect the metal rims referred to above, or the tire may be manufactured having only two widths namely the narrow treading width and the wide gable-like treading width, the latter being then the same as the width of the protecting buffers 27 of rubber molded at each side of the tire, see Fig. 3.

When fitting the tire airtightly to its wheel, I prefer using a small quantity of graphite or such like material, which is fitted within the endless airtight chamber, and tends to preserve the rubber of the tire under severe working conditions.

It is to be specially noted that all my tires are preferably manufactured capable of being airtightly attached to a wheel, see Figs. 1, 2 and 3, and when attaching the tire to its wheel for light traffic, I prefer using a wheel the outer circumference of which forms a clamping device, see Figs. 1 and 2, and so that the tire may be easily mounted on and demounted from the wheel by using say bolts and nuts, the endless air chamber being made an airtight chamber by bringing the right and left clamping flanges or outer wheel circumference parts suitably together, and when required having an endless airtight fabric 34, see Fig. 2, suitably fitted between the abutting inner flanges of the hooked right and left clamping circumferential metal rims of the wheel, to form an airtight joint.

In this invention, I do not confine myself to the dimensions given in this specification, as the tire may be constructed in all required dimensions to suit the work for which the tire is manufactured.

Claim.

A rubber tire having an internal air chamber and constructed in cross section with three special widths, a relatively narrow flat extreme circumferential tread part, a relatively wide gable-like tread part inside of said flat tread part, and rubber ribs or buffers which form the widest inner part of the tire, said gable-like tread part having transverse cavities and intervening ribs of equal width and which are staggered or alternated with each other on opposite sides of said flat tread part, substantially as described.

In testimony whereof I affix my signature in presence of two witnesses.

EDWARD BRICE KILLEN.

Witnesses:
 JOHN LIDDLE,
 JOHN TRAIN LIDDLE.